US007338568B2

(12) United States Patent
Lee et al.

(10) Patent No.: US 7,338,568 B2
(45) Date of Patent: Mar. 4, 2008

(54) METHOD AND ARRANGEMENT FOR ATTACHING LABELS TO SEMICONDUCTOR MODULES

(75) Inventors: Young-Soo Lee, Yongin-si (KR); Myung-Jong Eom, Daegu Metropolitan (KR); Byung-Man Kim, Cheonan-si (KR); Dong-Chun Lee, Cheonan-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 164 days.

(21) Appl. No.: 10/882,336

(22) Filed: Jul. 2, 2004

(65) Prior Publication Data

US 2005/0000635 A1 Jan. 6, 2005

(30) Foreign Application Priority Data

Jul. 4, 2003 (KR) ...................... 10-2003-0045409

(51) Int. Cl.
*B32B 41/00* (2006.01)

(52) U.S. Cl. ........................ 156/64; 156/556; 156/559; 156/566

(58) Field of Classification Search ................ 156/556, 156/559, 566
See application file for complete search history.

(56) References Cited

U.S. PATENT DOCUMENTS

| | | | | | |
|---|---|---|---|---|---|
| 1,873,967 | A | * | 8/1932 | Klute | 156/559 |
| 4,009,070 | A | * | 2/1977 | Linmans | 156/559 |
| 4,233,105 | A | * | 11/1980 | Albinger | 156/559 |
| 4,881,356 | A | * | 11/1989 | Beezer et al. | 53/53 |
| 5,158,640 | A | * | 10/1992 | Akiyama | 156/542 |
| 5,984,176 | A | * | 11/1999 | Koda et al. | 235/376 |

* cited by examiner

*Primary Examiner*—George Koch
(74) *Attorney, Agent, or Firm*—Harness, Dickey & Pierce, PLC

(57) ABSTRACT

A method and arrangement for attaching labels to a plurality of semiconductor modules arranged on a double-sided substrate is described which may shorten a process stream in an effort to reduce equipment costs. An exemplary arrangement may include at least one label attaching unit configured to attach labels to a plurality of semiconductor modules mounted on one of a first surface and a second surface of the double-sided substrate, and may include at least one turner configured to turn over the double-sided substrate to expose one of the first surface and second surface to the label attaching unit.

36 Claims, 8 Drawing Sheets

METHOD AND ARRANGEMENT FOR ATTACHING LABELS TO SEMICONDUCTOR MODULES

PRIORITY STATEMENT

This application claims the priority of Korean Patent Application No. 2003-45409, filed on Jul. 4, 2003, in the Korean Intellectual Property Office, the disclosure of which is incorporated herein in its entirety by reference.

BACKGROUND OF THE INVENTION

1. Field of the Invention

The present invention relates, in general, to a method and arrangement for attaching labels to semiconductor modules mounted on a double-sided substrate.

2. Description of the Related Art

As technologies develop in such industry fields as the electrical industry, electronic industry and telecommunication industry, there is an increasing use of semiconductor devices in these fields. For example, technical developments have led to performance enhancement and scaling-down of equipment and products used in the respective industry fields. The performance enhancement and scaling-down of electronic equipment and products may be obtained by installing semiconductor modules with various functions in electronic equipment and/or products. One technology utilized for mounting semiconductor modules on a surface of a substrate is referred to as a surface mounting technology (SMT).

Semiconductor devices, or modules, may be classified into memory modules which are configured for storing information and non-memory modules configured for performing calculation. A semiconductor device may include a plurality of semiconductor chips to perform desired functions. The semiconductor chips may be mounted on a printed circuit board (PCB) or a substrate, for example.

Labels reflecting information such as the ‘manufacturing company’, ‘manufactured date’, ‘product specification’, etc. may be attached to the respective semiconductor modules. A process for attaching labels to semiconductor modules may be considered as a final sub-process in a process of manufacturing a semiconductor device, for example.

FIG. 1 is a flow diagram illustrating a conventional process for mounting a plurality of semiconductor modules on a substrate and attaching labels to the semiconductor modules. Referring to FIG. 1, a process line includes a loading unit 100, a screen printer 200, a module mounting unit 300, a reflow unit 400, a label attaching unit 500, and an unloading unit 600. Each unit performs a corresponding process for a given time, and when the corresponding process is complete in a given unit, the following unit performs its corresponding process.

The loading unit 100 loads a substrate on which semiconductor modules will be mounted onto the process line. The substrate may be a rectangular shape of PCB, or may be a jig designed to allow semiconductor modules to be easily separated, for example. The loading unit 100 loads substrates in a sequential manner (one by one) on the process line, for example, on a conveyer belt. Here, a time interval in which each substrate is loaded on the conveyer belt, etc. may be uniform, and the follow-on units on the process line (i.e., screen printer 200, module mounting unit 300, reflow unit 400, label attaching unit 500, unloading unit 600) perform corresponding processes on the substrate for the time interval.

Referring to FIG. 1, the screen printer 200 may perform a screen printing process that prints a given area of the substrate surface with lead, etc. The screen printing process may be used to form outer leads of the semiconductor modules to be mounted on the substrate with lead, etc., using a screen with a given pattern. Successively, the module mounting unit 300 may mount semiconductor modules on the substrate. A substrate generally may include a plurality of semiconductor modules, for example, six, eight or ten semiconductor modules. After the module mounting unit 300 mounts the given number of semiconductor modules on the substrate, the reflow unit 400 may perform a reflow process that applies heat to the substrate in order to firmly adhere the outer leads of the semiconductor modules to the substrate.

A process that attaches labels to a surface on each of a plurality of semiconductor modules may then be performed at label attaching unit 500. The label may be embodies as a sticker which including various information (i.e., manufacturing company, manufactured date, product specification, etc.) regarding the semiconductor module. The label attaching process may be performed using a robot arm of the label attaching unit 500, for example. After the label attaching process is complete, the unloading unit 600 unloads the substrate from the process line.

The conventional label attaching process as described above may have several problems. The label attaching unit 500 does not include a turner for turning over the substrate. Accordingly, it may be difficult for the conventional label attaching unit 500 to apply labels to a double-sided substrate where semiconductor modules are mounted on both surfaces or sides (front surface and rear surface). For example, if the above-described processes are repeated in order to attach a label on a second surface of a substrate (front or rear surface) after attaching a label on a first surface (top or bottom surface) of the substrate, settings of the processes, as well as of working files, have to be repeated for labeling semiconductor modules on each surface of the substrate. Additionally, the label attached on the first surface could possibly be damaged due to heat generated when performing the reflow process on the second surface.

Further, if two conventional label attaching units are arranged in a row in an effort to solve the above problems, it is necessary to turn over the substrate manually in order to attach a label to a second surface (i.e., surface opposite to the surface in which labels were attached) of a semiconductor substrate after attaching a label to a first surface of the semiconductor substrate. The manual-operation may complicate the label attaching process, possibly reduce accuracy, may reduce process automation, and/or may possibly increase process costs. Since process times allocated to the respective units are pre-set in the conventional label attaching process, intervention of the manual turning operation may prevent the respective units from accurately performing their corresponding processes within the set process time (time interval).

SUMMARY OF THE INVENTION

Exemplary embodiments of the present invention are directed to a method and arrangement for attaching labels to a plurality of semiconductor modules arranged on a double-sided substrate. An exemplary arrangement may include at least one label attaching unit configured to attach labels to a plurality of semiconductor modules mounted on one of a first surface and a second surface of the double-sided substrate, and at least one turner configured to turn over the double-sided substrate to expose one of the first surface and second surface to the label attaching unit.

BRIEF DESCRIPTION OF THE DRAWINGS

The present invention will become more apparent by describing, in detail, exemplary embodiments thereof with reference to the attached drawings, wherein like elements are represented by like reference numerals, which are given by way of illustration only and thus do not limit the exemplary embodiments of the present invention.

DETAILED DESCRIPTION OF THE EXEMPLARY EMBODIMENTS

Figure 1:
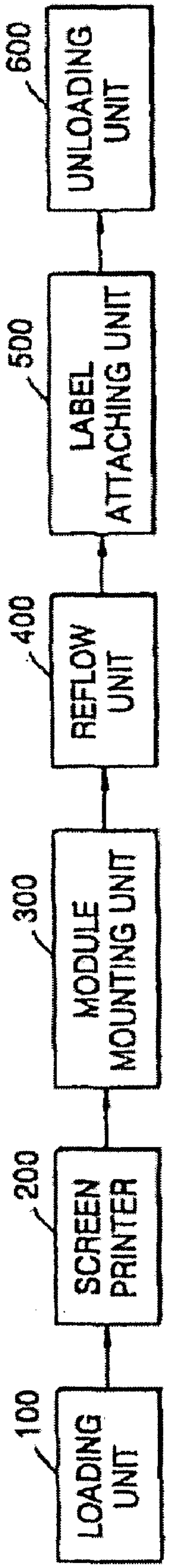
FIG. 1 (CONVENTIONAL ART)
FIG. 1 is a flow diagram illustrating a conventional process for mounting a plurality of semiconductor modules on a substrate and attaching labels to the semiconductor modules.

The present invention will be described more fully with reference to the accompanying drawings, in which exemplary embodiments of the invention are shown. It should be understood, however, that exemplary embodiments of the present invention described herein can be modified in form and detail without departing from the spirit and scope of the invention. Accordingly, the exemplary embodiments described herein are provided by way of example and not of limitation, and the scope of the present invention is not restricted to the particular embodiments described herein.

As will be described in further detail below, the exemplary embodiments of the present invention introduce an arrangement and method for attaching labels which may be capable of reducing equipment costs by simplifying a process line. The exemplary method and arrangement may be applicable to double-sided semiconductor modules as well as single-sided semiconductor modules, in an effort to achieve process automation.

In general, the exemplary arrangement may attach labels to a plurality of semiconductor modules mounted on front and rear surfaces (hereinafter, referred to as first and second surfaces) of a double-sided substrate. As will be seen in further detail below, an exemplary label application methodology, which is part of a manufacturing process for fabricating the semiconductor modules, may be used to attach the labels to the semiconductor modules mounted on the double-sided substrate. A set of semiconductor modules may be symmetrically mounted respectively on front and rear surfaces of a substrate according to a surface mounting technique (SMT), and the exemplary label attaching methodology described hereafter may attach labels to the semiconductor module products. The semiconductor modules may be mounted so as to have an asymmetric arrangement centering on a center line of one surface of the double-sided substrate, so the arrangement of semiconductor modules appears the same when turning over the double-sided substrate.

As a general example of how the modules may be mounted, each of first and second surfaces of a double-sided substrate may be separated into a left side and a right side centering on a center line of the double-sided substrate. On the left side of the first surface of the double-sided substrate, double-sided semiconductor module products (or single-sided semiconductor module products) may be mounted so that their front surfaces face upward. On the right side of the first surface of the doubled-sided substrate, double-sided semiconductor module products (or single-sided semiconductor module products) may be mounted so that their rear surfaces face upward.

Additionally, on the left side of the second (rear) surface of the double-sided substrate, double-sided semiconductor module products (or single-sided semiconductor module products) are mounted so that their rear surfaces face downward. On the right side of the second surface of the double-sided substrate, double-sided semiconductor module products (or single-sided semiconductor module products) are mounted so that their front surfaces face downward. The first and second surfaces of the double-sided substrate may thus have the same module surface arrangement as the substrate is turned over.

The exemplary methodology described hereafter may enable labels to be attached to the first and second surfaces of a double-sided substrate in the same setting state of the exemplary label attaching arrangement. Therefore, when attaching labels to double-sided semiconductor module products, it may be unnecessary to change process files, various jigs and/or components of an equipment line including the label attaching arrangement.

As will be seen below in further detail, and in an alternative embodiment, the exemplary arrangement and methodology may provide two label attaching units and two turners alternately arranged so as to perform the labeling on the first surface, turning to expose the second surface, labeling of the second surface, and turning of the substrate back to its state or position for unloading. Such an arrangement may further reduce process time and/or equipment costs, for example.

Figure 2:
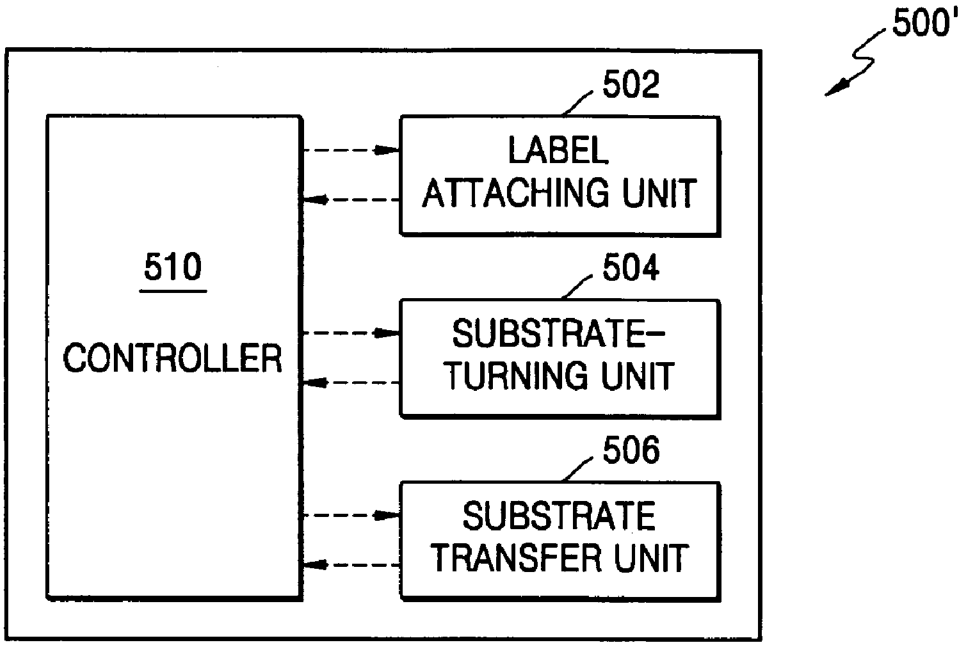
FIG. 2 is a block diagram showing an arrangement for attaching a label to a semiconductor module according to an exemplary embodiment of the present invention.

FIG. 2 is a block diagram showing an arrangement for attaching a label to a semiconductor module according to an exemplary embodiment of the present invention. Referring to FIG. 2, the label attaching arrangement 500' may correspond to a label attaching unit 500 on the equipment line shown in FIG. 1. The label attaching arrangement 500' of FIG. 2 may include a label attaching unit 502, a substrate turning unit 504, hereafter referred to as a 'turner' 504, and a controller 510. The label attaching arrangement 500' may further include a substrate transfer unit 506. The operations of the label attaching unit 502, the turner 504, and the substrate transfer unit 506 may be controlled by the controller 510.

The label attaching unit 502 may be embodied as machinery such as a robot arm, for example. The turner 504 may be embodied by any structure or equipment which is configured to turn or flip a substrate from one side or surface to another.

For example, the turner 504 may be used to turn over double-sided substrates supporting semiconductor modules on either side or surface. The substrate transfer unit 506 may be used to move the double-sided substrate forward or backward, regardless of the direction of movement of the double-sided substrate in the label attaching arrangement 500'. The substrate transfer unit 506 may move a substrate to a desired location in a given process time, regardless of the movement direction of the substrate on a process line. Thus, it is possible to attach labels to double-sided semiconductor module products using only a turner and a label attaching unit. As discussed above, operations of the substrate transfer unit 506 may be controlled by the controller 510.

The label attaching arrangement 500' may be unlike the conventional label attaching unit, which has only a label attaching function. The label attaching arrangement 500' may be embodied as a combination of components, including one or more label attaching units and one or more turners, for example. Additionally, the label attaching arrangement 500' may apply a label to the front and rear surfaces of a double-sided substrate, so as to improve efficiency in attaching labels to double-sided semiconductor module products. As would be evident to one or ordinary skill in the art, the label attaching arrangement 500' may also be configured to attach labels to single-sided semiconductor modules mounted on a double-sided substrate or on a general PCB.

Figure 3A:
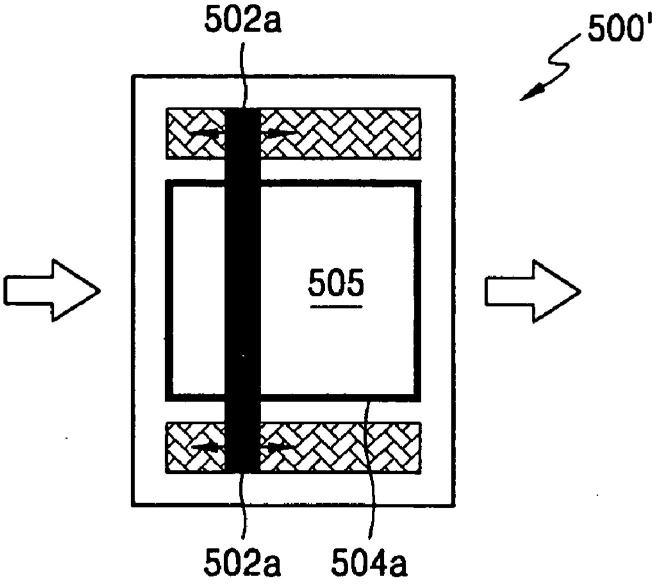
FIGS. 3*a* through 3*c* illustrate exemplary configurations of an equipment line of an exemplary label attaching arrangement according to an exemplary embodiment of the present invention.
Figure 3B:
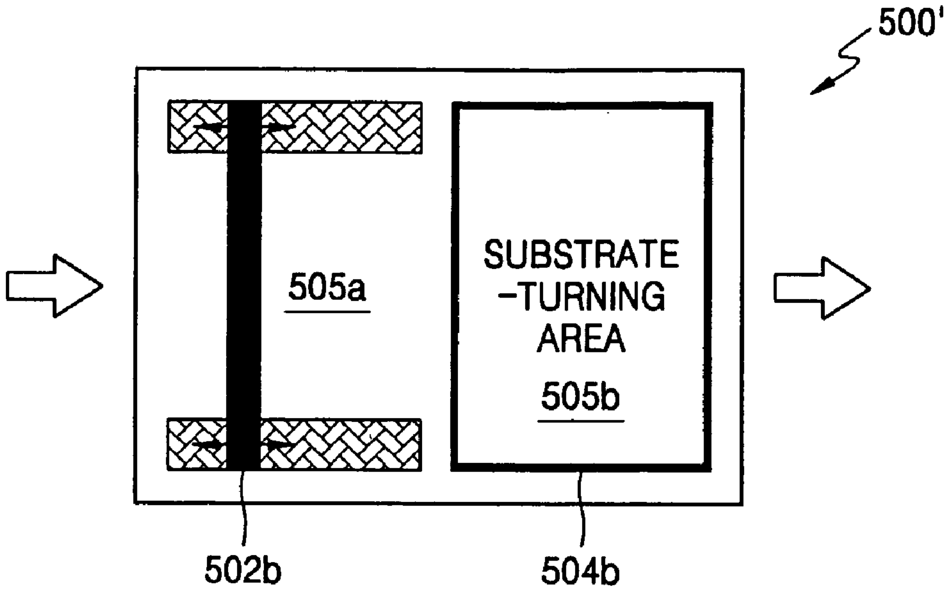
Figure 3C:
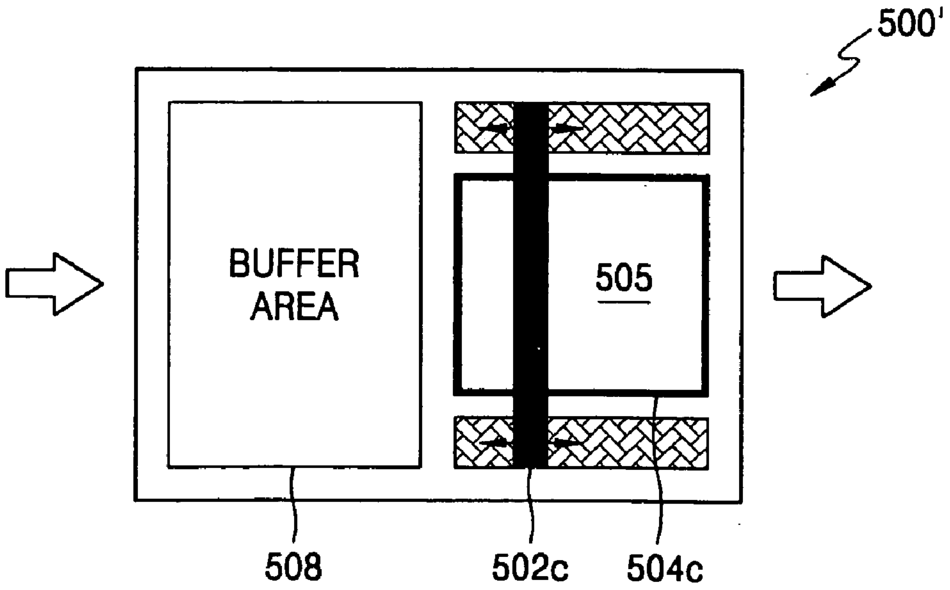

FIGS. 3*a* through 3*c* illustrate exemplary configurations of an equipment line of an exemplary label attaching arrangement according to an exemplary embodiment of the present invention. FIGS. 3*a* through 3*c* are provided to describe a label attaching arrangement which includes a label attaching unit and a turner.

Referring to FIG. 3*a*, within label attaching arrangement 500', a substrate may be turned over and subjected to label attaching in the same space. For example, a label attaching unit 502*a* may perform a label attaching process on a substrate that is loaded on a turner 504*a*. This process may be performed within a substrate-turning and label-attaching area 505, as shown in FIG. 3*a*. In the example of FIG. 3*a*, a separate substrate transfer unit 506 (not shown) for transferring a substrate in a reverse direction of the movement direction of the substrate on the process line is not necessary. Also, since the label attaching arrangement 500' occupies a relatively small area, the length of an entire process line may be reduced.

Hereinafter, a method for attaching labels to semiconductor modules mounted on a double-sided substrate based on the label attaching arrangement 500' shown in FIG. 3*a* is described. If a substrate subjected to a reflow process (i.e., at reflow unit 400 of FIG. 1) is loaded to the label attaching arrangement 500', a label attaching process may be performed within the substrate-turning and label-attaching area 505 on the first surface of the substrate by the label attaching unit 502*a*, the first surface including semiconductor modules thereon. Then, the substrate may be turned over by the turner 504*a* to expose the second surface containing semiconductor modules thereon. Successively within the substrate-turning and label-attaching area 505, a label attaching process may be performed by the label attaching unit 502*a* to attach labels to the semiconductor modules on the second surface. Accordingly, a single operation area may be provided for label attaching and substrate turning processes.

Since a double-sided substrate is used in this example, it is unnecessary to change a work file or other process settings, even when turning over the substrate. The substrate (with labels having been applied to the semiconductor modules on both first and second surfaces), may then be turned over within the substrate-turning and label-attaching area 505 by the turner 504*a* to return to its initial state or orientation, for unloading from the label attaching arrangement 500' by a suitable component such as the unloading unit 600 shown in FIG. 1, for example. This process may successively repeated for subsequent substrates, i.e., another substrate may loaded on the label attaching arrangement 500' and subjected to the above-described processes.

Referring to FIG. 3*b*, and in another example, the label attaching arrangement 500' may be configured so that a label attaching unit 502*b* and a turner 504*b* have independent operation areas, respectively, here shown as a label-attaching area 505*a* and substrate-turning area 505*b*. The label attaching unit 504*b* and the turner 504*b* may thus be located sequentially in the movement direction of the substrates on the process line. Also, the label attaching arrangement 500' shown in FIG. 3*b* may further include a substrate transfer unit 506, not shown in FIG. 3*b* for purposes of clarity.

Hereinafter, another exemplary method for attaching labels to semiconductor modules mounted on a double-sided substrate using the label attaching arrangement 500' as shown in FIG. 3*b* is described. If a substrate subjected to a reflow process (i.e., at reflow unit 400 of FIG. 1) is loaded to the label attaching arrangement 500', a label attaching process may be performed within label-attaching area 505*a* on the first surface of the substrate by the label attaching unit 502*b*, the first surface including semiconductor modules thereon. Then the substrate may be transferred from the label attaching unit 502*b*, via substrate transfer unit 506 (see FIG. 2) to the turner 504*b*. The substrate may be turned over within the substrate-turning area 505*b* by the turner 504*a* to expose the second surface containing semiconductor modules thereon. Successively, the substrate may be transferred, via substrate transfer unit 506, from the turner 504*b* back to label-attaching area 505*a* of the label attaching unit 502*b* to attach labels to the semiconductor modules on the second surface.

Since a double-sided substrate is used in this example, it is unnecessary to change a work file or other process settings when turning over the substrate. Successively, the substrate may be transferred between operation areas, from the label attaching unit 502*b* to the turner 504*b* using the substrate transfer unit 506. The substrate (with labels having been applied to the semiconductor modules on both first and second surfaces), may then be turned over within the substrate-turning area 505*b* by the turner 504*b* to return to its initial state or orientation, for unloading from the label attaching arrangement 500' by a suitable component such as the unloading unit 600 shown in FIG. 1, for example. This process may successively repeated for subsequent substrates, i.e., another substrate may loaded on the label attaching arrangement 500' and subjected to the above-described processes.

Referring now to FIG. 3*c*, and in another example, the label attaching arrangement 500' of FIG. 3*c* is similar to the label attaching arrangement shown in FIG. 3*a*, in that a label attaching unit 502*c* and a turner 504*c* share the same operation area (i.e., substrate-turning and label-attaching area 505). However, the label attaching arrangement 500' of FIG. 3*c* may further include a buffer area 508. The buffer area 508 may be provided in the substrate loading area or substrate unloading area of the label attaching arrangement 500', and may be employed to adjust an entire process time of the label attaching arrangement 500', as related to the individual processing times of different components composing the process line. An exemplary method for attaching labels to semiconductor modules on first and second surfaces performed by the exemplary label attaching arrangement 500' as shown in FIG. 3*c* may be the same as described above with reference to FIG. 3*a*.

Figure 4A:
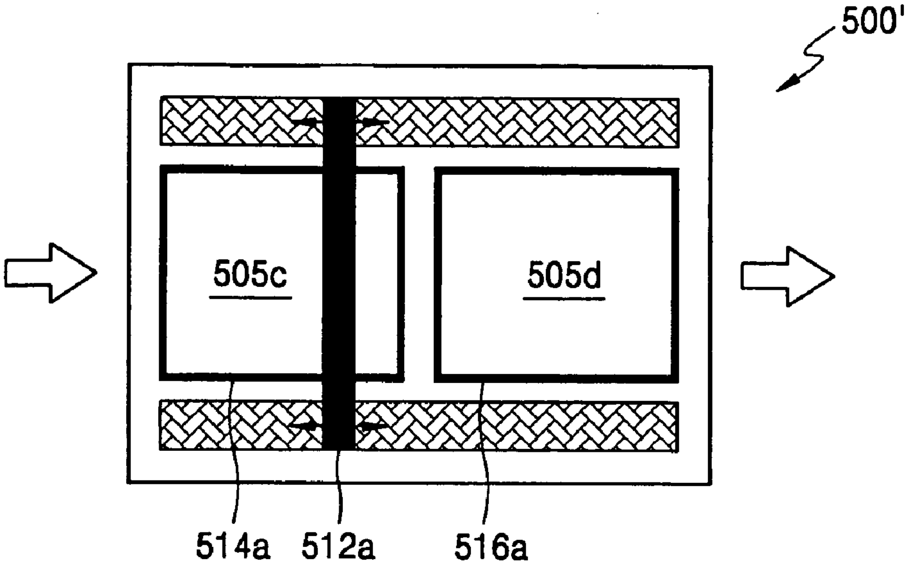
FIGS. 4*a* and 4*b* illustrate exemplary configurations of an equipment line of an exemplary label attaching arrangement according to another exemplary embodiment of the present invention.
Figure 4B:
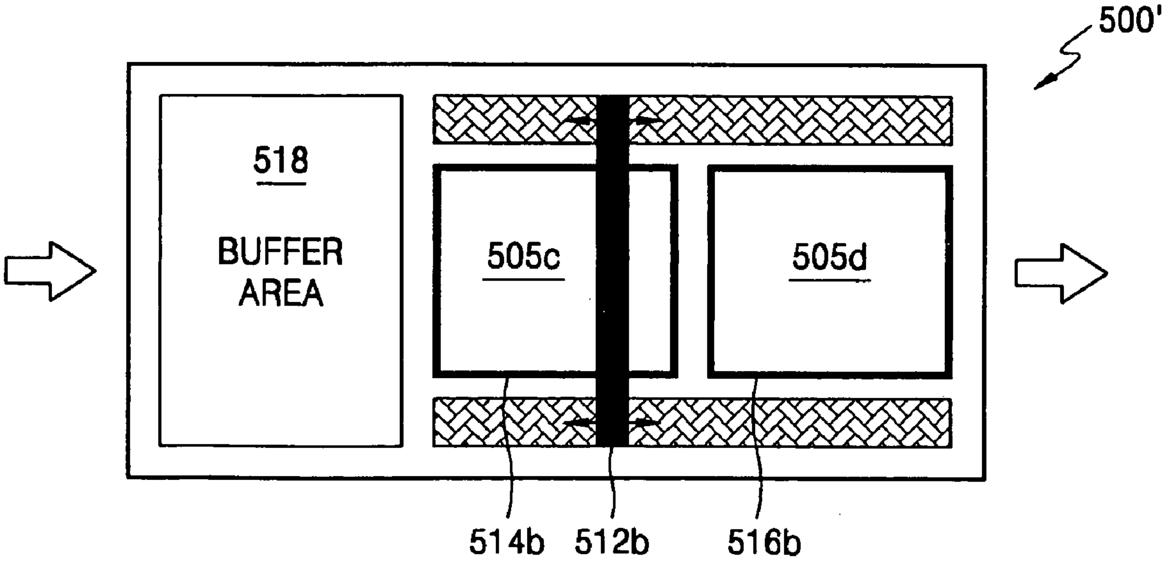

FIGS. 4*a* and 4*b* illustrate exemplary configurations of an equipment line of an exemplary label attaching arrangement according to another exemplary embodiment of the present invention. FIGS. 4*a* and 4*b* are provided to describe an exemplary label attaching arrangement which includes a label attaching unit 512*a* and two turners 514*a* and 516*a*, in addition to the substrate transfer unit.

Referring to FIG. 4*a*, in this exemplary label attaching arrangement 500', a substrate may be turned over and subjected to label attaching in the same space or operation area, as in FIG. 3*a*. In FIG. 4*a*, there is shown a combined operation area for label attaching unit 512*a* and tuner 514*a* (referred to as a first substrate-turning and label-attaching area 505*c*), and a combined operation area for label attaching unit 512*a* and tuner 516*a* (referred to as a second substrate-turning and label-attaching area 505*d*), Unlike FIG. 3*a*, since two turners 514*a* and 516*a* are provided, the label attaching unit 512*a* of FIG. 4*a* may perform a label attaching process on each respective substrate that is loaded on the two turners 514*a* and 516*a*. Thus, since a process stream may be shortened, and as two substrates may be concurrently processed in the label attaching arrangement 500', it may be possible to further reduce processing time for attaching labels to the semiconductor modules of the substrate.

For example, if a first substrate subjected to the reflow process (i.e., at reflow unit 400 of FIG. 1) is loaded in the first substrate-turning and label-attaching area 505*c* of the label attaching arrangement 500', a label attaching process may be performed on the first surface of the first substrate by the label attaching unit 512*a*. Then, the first substrate may be turned over by the first turner 514*a* to expose the second surface containing semiconductor modules thereon. Next, the substrate transfer unit 506 (not shown in FIG. 4*a* for clarity) may transfer the first substrate from the first substrate-turning and label-attaching area 505*c* to the second substrate-turning and label-attaching area 505*d*.

Simultaneously with or shortly after the transfer, a second substrate may be loaded in the first substrate-turning and label-attaching area 505*c*. Concurrently within second substrate-turning and label-attaching area 505*d*, a label attaching process may be performed on the exposed second surface of the first substrate by the label attaching unit 512*a*. In the case where the second substrate has been loaded in the first substrate-turning and label-attaching area 505*c*, a label attaching process to attach labels may be subsequently performed on the semiconductor modules contained on the first surface of the second substrate. Thus, a substantially continuous labeling attaching process may be performed on surfaces of two different substrates, in accordance with this example.

Since double-sided substrates are used in this example, it is possible to attach labels to the second surface of the first substrate and to the first surface of the second substrate without changing a work file or other process settings, even when turning over the substrates. Successively, in the first substrate-turning and label-attaching area 505*c*, the first turner 514*a* turns over the second substrate to expose the second surface, and in the second substrate-turning and label-attaching area 505*d*, the second turner 516*a* turns over the first substrate (which has had the semiconductor modules labeled on both surfaces of the substrate) to return the first substrate to its initial state or orientation.

Then, the first substrate may be unloaded from the second substrate-turning and label-attaching area 505*d* (such as by unloading unit 600 of FIG. 1). Simultaneously, the second substrate (having been turned to expose the second surface) may be transferred, via substrate turning unit 506, from the first substrate-turning and label-attaching area 505*c* to the second substrate-turning and label-attaching area 505*d*, where semiconductor modules on the second surface may be labeled and then the substrate turned to its original state, as discussed above regarding the first substrate. This process may successively repeated for subsequent substrates, i.e., another substrate may loaded in the first substrate-turning and label-attaching area 505*c* of FIG. 4*a* and subjected to the above-described processes.

Referring to FIG. 4*b*, the label attaching arrangement 500' of FIG. 4*a* may further include a buffer area 518. That is, the label attaching arrangement 500' of FIG. 4*b* is substantially identical to FIG. 4*a*, with the exception that buffer area 518 is located before the first turner 514*a*. The buffer area 518 corresponds to the buffer area 508 shown in FIG. 3*c*. Thus a detailed description of each of the label attaching unit 512*a*, the first turner 514*a*, second turner 516*a* and buffer area 518 is omitted for reasons of brevity.

Figure 5:
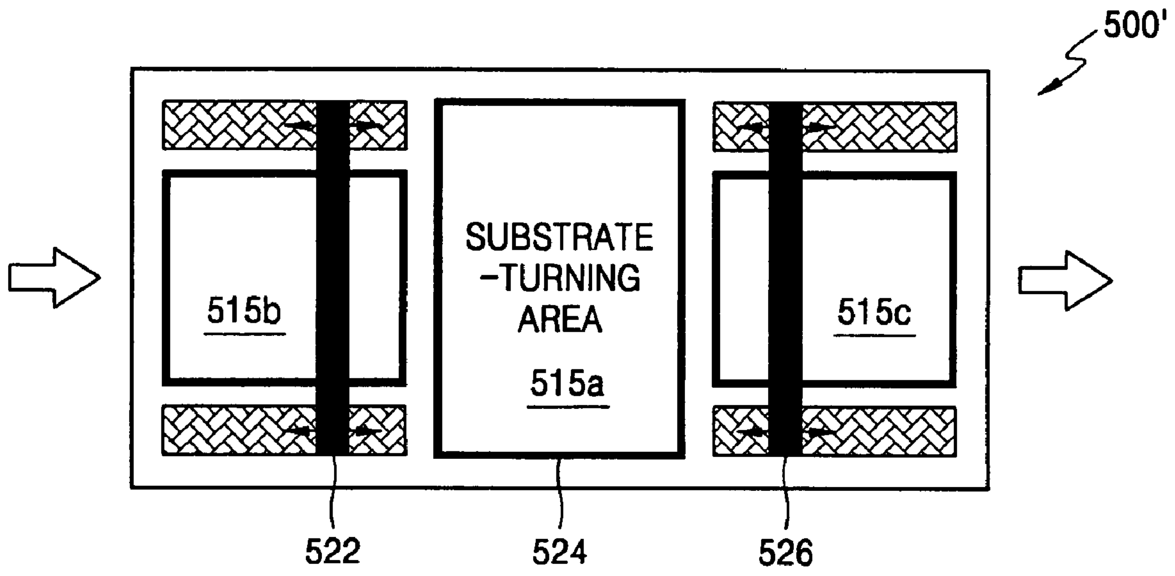
FIG. 5 illustrates an exemplary configuration of an equipment line of an exemplary label attaching arrangement according to another exemplary embodiment of the present invention.

FIG. 5 illustrates an exemplary configuration of an equipment line of an exemplary label attaching arrangement according to another exemplary embodiment of the present invention. FIG. 5 is provided to describe a label attaching arrangement which may include two label attaching units and a single turner.

The label attaching arrangement 500' of FIG. 5 may include a first label attaching unit 522, a second label attaching unit 526 and a turner 524, which may be located sequentially in the movement direction of substrates on a process line, as shown in FIG. 5 The label attaching arrangement 500' may also include a substrate transfer unit 506 (not shown for reasons of clarity). In FIG. 5, a substrate-turning area 515*a* may be separated from a first label-attaching area 515*b* and a second label-attaching area 515*c*.

FIGS. 6*a* through 6*i* are views explaining a method for attaching labels to semiconductor modules mounted on a double-sided substrate using the arrangement of FIG. 5, according to an exemplary embodiment of the present invention. In the drawings, for convenience of description only, a process that attaches labels to single-sided semiconductor module products using a double-sided substrate is shown. However, it is evident to those of ordinary skill in the art that the label attaching process may be applicable to double-sided semiconductor module products.

The methodology described with reference to FIGS. 6*a* to 6*i* may symmetrically mount a set of semiconductor modules respectively on front and rear surfaces of a substrate according to a surface mounting technique (SMT), and may attach labels to the semiconductor module products. The semiconductor modules may be mounted so as to have an asymmetric arrangement centering on a center line of one surface of the double-sided substrate, so the arrangement of semiconductor modules appears the same when turning over the double-sided substrate.

Figure 6A:
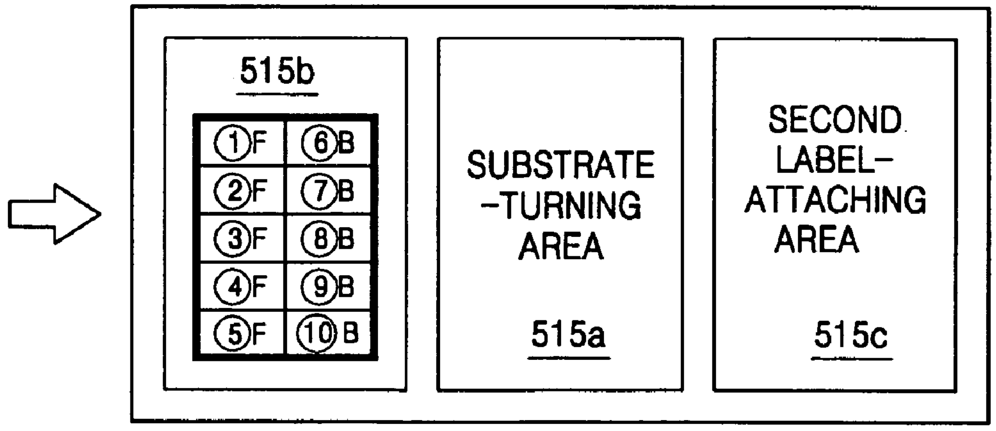
FIGS. 6*a* through 6*i* are views explaining a method for attaching labels to semiconductor modules mounted on a double-sided substrate using the arrangement of FIG. 5, according to an exemplary embodiment of the present invention.

Referring now to FIG. 6*a*, a first substrate transferred from a reflow unit may loaded in first label-attaching area 515*b*. For example, the first substrate may be a substrate with 10 arrayed products. On the left side of the first surface of the first substrate, five semiconductor modules (①F through ⑤F) may be mounted so that their front surfaces face upward. On the right side of the first surface of the first substrate, five semiconductor modules (⑥B through ⑩B) may be mounted so that their rear surfaces face upward. These modules are shown loaded in the first label attaching area 515*b*.

Figure 6B:
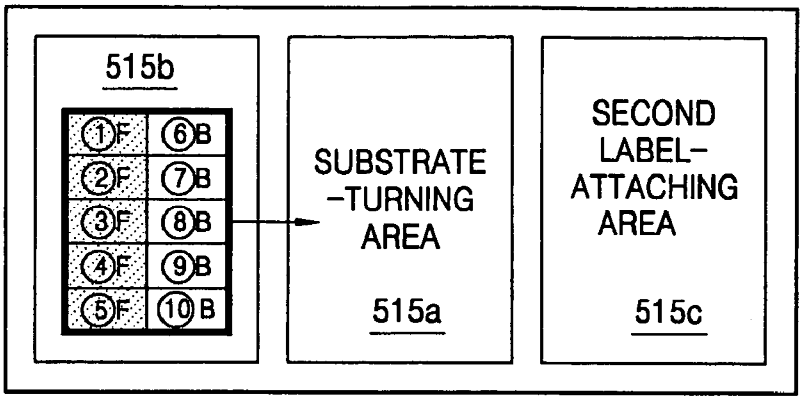
Figure 6C:
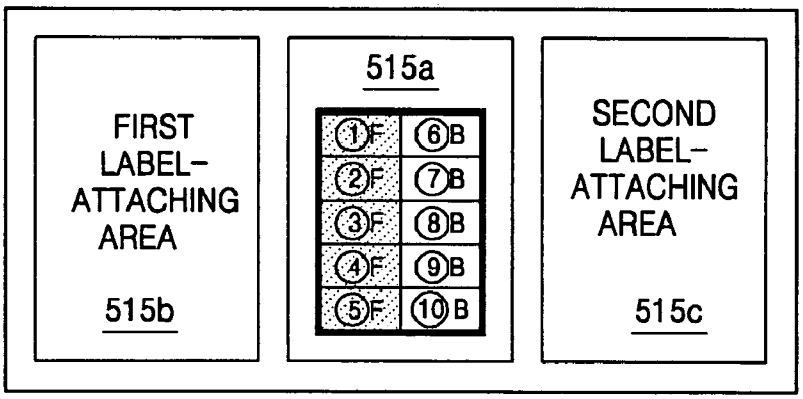
Figure 6D:
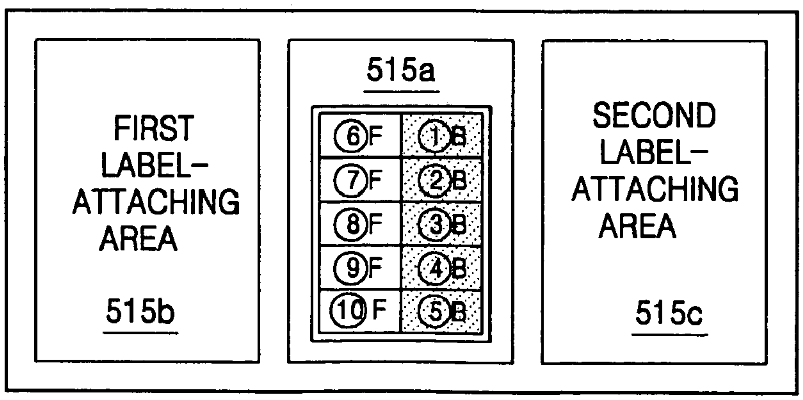

Referring to FIG. 6*d*, on the left side of the second surface of the first substrate, five semiconductor modules (⑥F through ⑩F) may be mounted so that their front surfaces face upward. On the right side of the second surface of the first substrate, five semiconductor modules (F① through F⑤) may be mounted so that their rear surfaces face upward. These modules are shown loaded in the substrate turning area 515*a*.

No label attaching process is performed on the rear surfaces of the semiconductor modules. In the first label-attaching area 515*b* on which the first substrate is loaded, first label attaching unit 522 attaches labels to the front surfaces of the five semiconductor modules (①F through ⑤F) located on the left side of the first surface of the first substrate. The result is shown in FIG. 6*b*, where a dark area of the left side of the first substrate represents that labels are attached to the front surfaces of the semiconductor modules (①F through ⑤F).

Referring to FIG. 6*c*, the first substrate may be transferred, via substrate transfer unit 506 (not shown for clarity) to substrate-turning area 515*a*. In the substrate-turning area 515*a*, the first substrate may turned over by the turner 524. The state of the turned first substrate is shown in FIG. 6*d*.

Figure 6E:
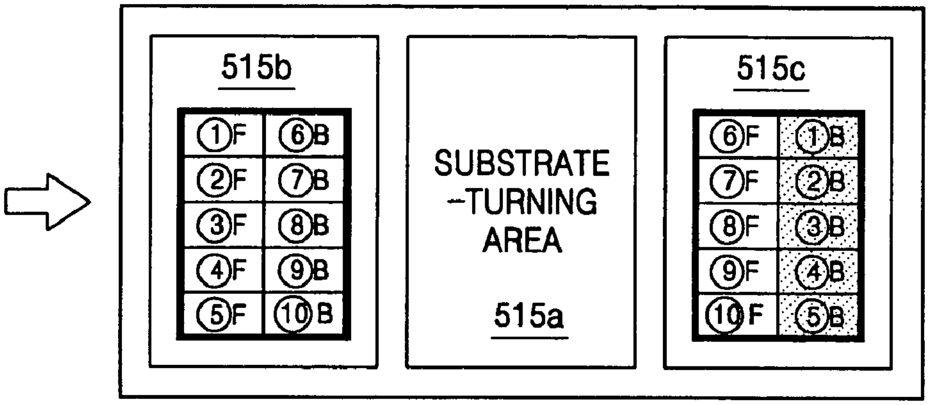

Referring to FIG. 6*e*, the first substrate may be transferred, via substrate transfer unit 506, from the substrate-turning area 515*a* to the second label-attaching area 515*c*. Then, simultaneously as the first substrate is removed from the first label-attaching area 515*b*, or after the first substrate is removed from the first label-attaching area 515*b*, a second substrate may be loaded in the first label-attaching area 515*b*. As a result, two substrates may be loaded and processed in a single label attaching arrangement, which may reduce total processing time for label attaching.

Figure 6F:
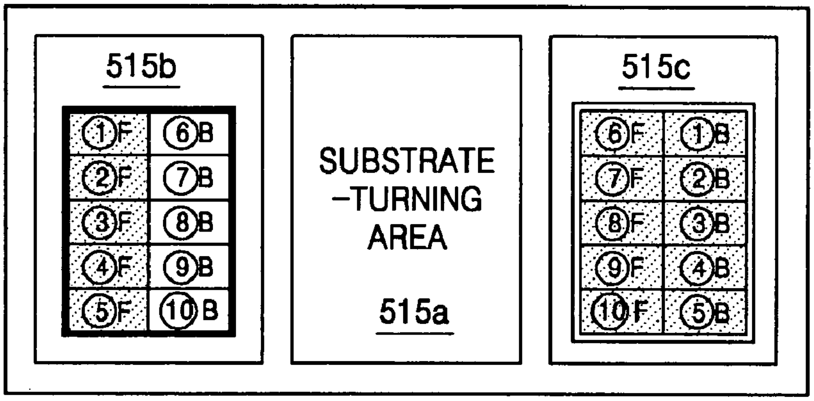

Referring to FIG. 6*f*, a label attaching process may be performed on the first and second substrates. In this process, the second label attaching unit 526 may attach labels to semiconductor modules mounted on the left side of the second surface of the first substrate. Simultaneously, the first label attaching unit 522 may attach labels to semiconductor modules mounted on the left side of the first surface of the second substrate (see dark area).

The label attaching process for the second substrate may be performed anytime before the second substrate is transferred to the substrate-turning area 515*a*. As a result, and in the case of the second substrate, labels may be attached only to the left side of the first surface of the second substrate. In the case of the first substrate, labels may be attached to all the left sides of the first and second surfaces of the first substrate.

Figure 6G:
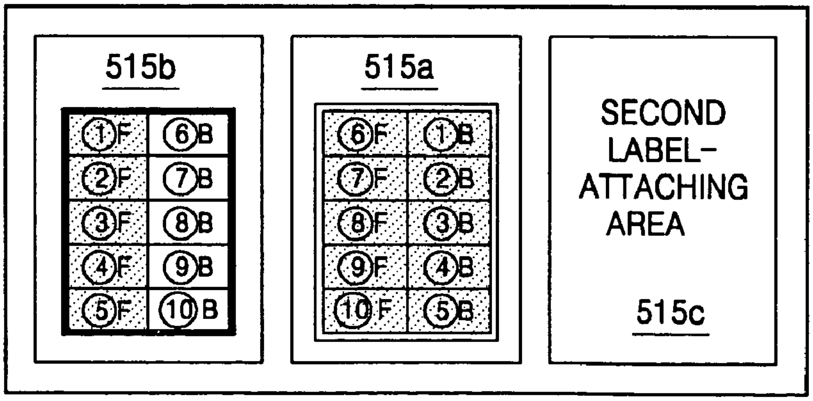
Figure 6H:
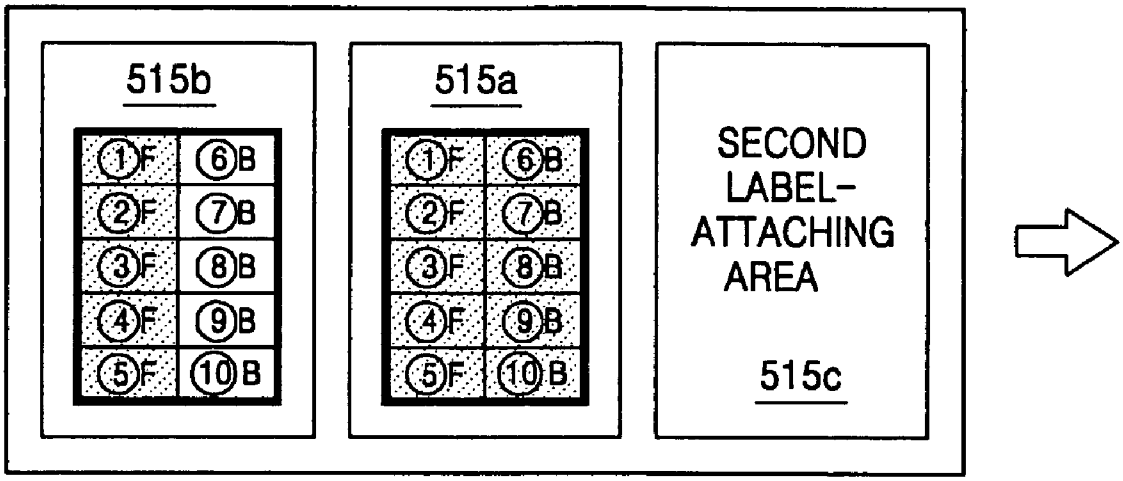

Referring to FIG. 6*g*, the first substrate may be transferred, via the substrate transfer unit 506, from the second label-attaching area 515*c* back to the substrate-turning area 515*a*. Then, in the substrate-turning area 515*a*, the first substrate may be turned over by turner 524. The result is shown in FIG. 6*h*, in which the first surface of the first substrate faces upward as in the initial state thereof. Successively, the first substrate (having been subjected to a label attaching process) may be unloaded from the label attaching arrangement 500', and the second substrate may be transferred, via substrate transfer unit 506, from the first label-attaching area 515*b* to the substrate-turning area 515*a*. The resultant state is shown in FIG. 6*i*.

Figure 6I:
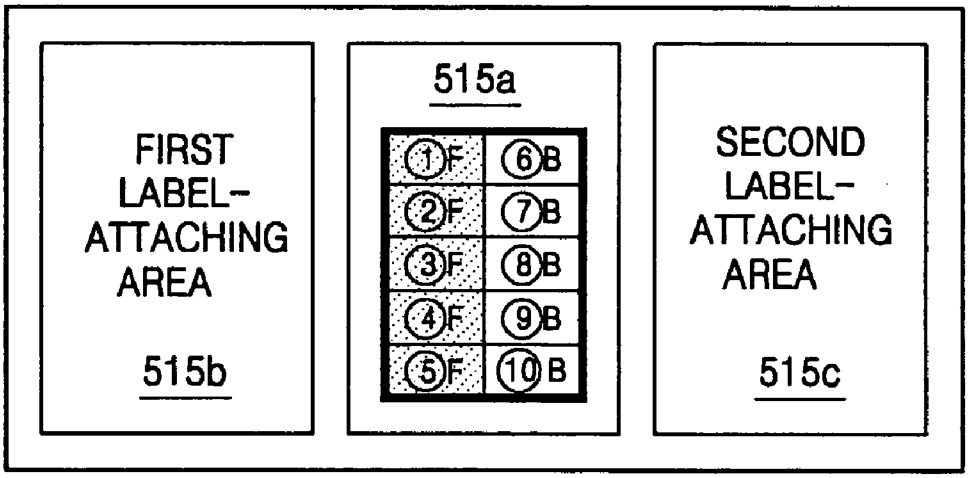

The state shown in FIG. 6*i* is the same as that shown in FIG. 6*c*. Accordingly, after the function illustrated in FIG. 6*i*, the functions shown in FIGS. 6*d* through 6*h* may be sequentially performed on the second and subsequent substrates.

Therefore, according to the exemplary embodiments of the present invention, it is possible to automate a label attaching process for double-sided substrates. Accordingly, a probability of error generation in the label attaching process may be reduced and/or possibly eliminated, and process costs may be reduced. Additionally, since at least one label attaching unit and at least one turner are included in a label attaching arrangement, a process stream may be shortened so that equipment costs can be reduced. Use of a substrate transfer unit in the label attaching arrangement may allow a label attaching process to be performed on double-sided substrates using fewer label attaching units and turners, thereby further reducing equipment costs.

The label attaching method and arrangement according to the exemplary embodiments of the present invention are adapted to perform a label attaching process on single-sided semiconductor module products, as well as double-sided semiconductor module products. Accordingly, since it is unnecessary to install different equipment based on the type of semiconductor module product, equipment costs may be further reduced.

The exemplary embodiments of the present invention being thus described, it will be obvious that the same may be varied in many ways. Such variations are not to be regarded as departure from the spirit and scope of the exemplary embodiments of the present invention, and all such modifications as would be obvious to one skilled in the art are intended to be included within the scope of the following claims.

What is claimed is:

1. An arrangement for attaching labels on semiconductor modules mounted on a double-sided substrate, comprising:

a first label attaching unit configured to attach labels to a plurality of semiconductor modules mounted on one of a first surface and a second surface of the double-sided substrate;

a first turner configured to turn over the double-sided substrate on which the labeled semiconductor modules are mounted;

a controller configured to control the first label attaching unit and first turner; and a second turner under control of the controller and configured to turn over the double-sided substrate, wherein the first turner turns over the double-sided substrate to expose the second surface thereof, and the second turner turns over the double-sided substrate to expose the first surface thereof, and the first label attaching unit attaches labels to the semiconductor modules mounted on the first and second surfaces.

2. The arrangement of claim 1, further comprising:

a substrate transfer unit under control of the controller and configured to transfer the double-sided substrate to a different location in the arrangement.

3. The arrangement of claim 2, wherein the substrate transfer unit moves the double-side substrate forward or backward along a direction of movement through the arrangement.

4. The arrangement of claim 1, wherein the first label attaching unit is adapted to operate within an operational area of one of the first turner and second turner.

5. The arrangement of claim 1, further comprising:

a second label attaching unit under control of the controller and configured to attach labels to the semiconductor modules mounted on the second surface of the double-sided substrate.

6. The arrangement of claim 5, wherein the first label attaching unit, the first turner and the second label attaching unit are mounted sequentially in a movement direction of the double-sided substrate.

7. The arrangement of claim 6, further comprising:

a substrate transfer unit under control of the controller and configured to transfer the double-sided substrate back and forth between the first turner and the second label attaching unit.

8. The arrangement of claim 1, wherein the arrangement is located between a loading unit for loading the double-sided substrate and an unloading unit for unloading the double-sided substrate with the labelled semiconductor modules.

9. A method for attaching labels to a plurality of semiconductor modules arranged on a double-sided substrate, comprising:

(a) attaching labels to the plurality of semiconductor modules mounted on a first surface of the double-sided substrate;

(b) turning over the double-sided substrate on which the labeled semiconductor modules are mounted to expose a second surface using a first turner and a second turner configured to turn over the double-sided substrate to expose the first surface thereof; and (c) attaching labels to the plurality of semiconductor modules mounted on the second surface.

10. The method of claim 9, further comprising:

(d) turning over the double-sided substrate to prepare the double-sided substrate with labeled semiconductor modules on the first and second surfaces in preparation for an unloading operation.

11. The method of claim 10, further comprising:

(e) unloading the double-sided substrate with labeled semiconductor modules.

12. The method of claim 9, further comprising:

(d) loading the double-sided substrate in preparation for (a).

13. The method of claim 9, wherein (a) and (b) are performed in the same operation area.

14. The method of claim 9, wherein (a) and (b) are performed in different operation areas.

15. The method of claim 9, further comprising:

(d) transferring the double-sided substrate with labeled semiconductor modules on the first surface thereof in preparation for (b);

(e) transferring the double-sided substrate upon completion of (b) in preparation for (c); and (f) transferring the double-sided substrate with labeled semiconductor modules upon completion of (c) in preparation for an unloading operation.

16. The method of claim 15, further comprising:

(g) turning over the double-sided substrate with labeled semiconductor modules on both the first and second surfaces so as to return the double-sided substrate to its original orientation; and (h) unloading the double-sided substrate from the label attaching system.

17. A method for attaching labels to a plurality of semiconductor modules arranged on a double-sided substrate, comprising:

(a) attaching labels to a plurality of semiconductor modules mounted on a first surface of the double-sided substrate;

(b) turning over the double-sided substrate on which the labeled semiconductor modules are mounted to expose a second surface of the double-sided substrate using a first turner and a second turner configured to turn over the double-sided substrate to expose the first surface thereof;

(c) attaching labels to a plurality of semiconductor modules mounted on the second surface; and (d) transferring the double-sided substrate with labeled semiconductor devices on the first and second surfaces in preparation for an unloading operation.

18. The method of claim 17, further comprising:

(e) turning over the double-sided substrate with labeled semiconductor modules on the first and second surfaces so as to return the double-sided substrate to its original orientation; and (f) unloading the double-sided substrate from the label attaching system.

19. The method of claim 17, further comprising:

(e) loading the double-sided substrate in preparation for (a).

20. A method for attaching labels to a plurality of semiconductor modules arranged on a double-sided substrate, comprising:

(a) attaching labels to the, plurality of semiconductor modules mounted on a first surface of the double-sided substrate;

(b) transferring the double-sided substrate with the labeled semiconductor modules on the first surface in preparation for a turning operation;

(c) turning over the double-sided substrate on which the labeled semiconductor modules are mounted to expose the second surface using a first turner and a second turner configured to turn over the double-sided substrate to expose the first surface thereof;

(d) transferring the double-sided substrate with the exposed second surface in preparation for a label attaching operation;

(e) attaching labels to a plurality of semiconductor modules mounted on the second surface;

(f) transferring the double-sided substrate with the labeled semiconductor modules on the first surface and second surface in preparation for a turning operation;

(g) turning over the double-sided substrate with labeled semiconductor modules on both the first and second surfaces so as to return the double-sided substrate to its original orientation prior to (a); and (h) unloading the double-sided substrate.

21. The method of claim 20, further comprising:

(i) loading the double-sided substrate in preparation for (a).

22. The method of claim 21, wherein after (b) and before (g), the method further comprises:

(j) loading another double-sided substrate; and (k) attaching labels to a plurality of semiconductor modules mounted on a first surface of the double-sided substrate.

23. The method of claim 22, wherein (j) is performed simultaneously with (d) and (k) is performed simultaneously with (e).

24. An arrangement for attaching labels on semiconductor modules mounted on a double-sided substrate, comprising:

at least one label attaching unit configured to attach labels to a plurality of semiconductor modules mounted on one of a first surface and a second surface of the double-sided substrate; and first and second turners configured to turn over the double-sided substrate on which the labeled semiconductor modules are mounted to expose one of the first surface and second surface to the label attaching unit, wherein the first turner turns over the double-sided substrate to expose the second surface thereof, and the second turner turns over the double-sided substrate to expose the first surface thereof, and the at least one label attaching unit attaches labels to the semiconductor modules mounted on the first and second surfaces.

25. The arrangement of claim 24, further comprising:

a controller configured to control operations of the at least one label attaching unit and the at least one turner.

26. The arrangement of claim 24, further comprising:

a substrate transfer unit configured to transfer the double-sided substrate to back and forth between the at least one turner and the at least one label attaching unit.

27. The arrangement of claim 26, further comprising:

a controller configured to control operations of the at least one label attaching unit, the at least one turner and the substrate transfer unit.

28. The arrangement of claim 24, wherein the double-sided substrate is turned by the at least one turner and the labels are applied by the label attaching unit in the same operation area.

29. The arrangement of claim 26, wherein the double-sided substrate is turned by the at least one turner in a first operation area, and the labels are applied by the at least one label attaching unit in a second operation area.

30. A method for attaching labels to a plurality of semiconductor modules arranged on one or more double-sided substrates, comprising:

(a) attaching labels to the plurality of semiconductor modules mounted on a first surface of a first double-sided substrate;

(b) transferring the first double-sided substrate in preparation for a turning operation;

(c) turning over the double-sided substrate on which the labeled semiconductor modules are mounted to expose the second surface using a first turner and a second turner configured to turn over the double-sided substrate to expose the first surface thereof;

(d) transferring the first double-sided substrate in preparation for a label attaching operation while simultaneously loading a second double-sided substrate in preparation for (a); and (e) attaching labels to a plurality of semiconductor modules mounted on the second surface of the first double-sided substrate while simultaneously attaching labels to a plurality of semiconductor modules mounted on a first surface of the second double-sided substrate loaded in (d).

31. An arrangement for attaching labels on semiconductor modules mounted on a double-sided substrate in accordance with the method of claim 9, the arrangement including:

a first label attaching unit configured to attach the labels to the plurality of semiconductor modules mounted on the first surface of the double-sided substrate;

a first turner configured to turn over the double-sided substrate on which the labeled semiconductor modules are mounted; and a second label attaching unit configured to attach the labels to the plurality of semiconductor modules mounted on the second surface of the double-sided substrate.

32. An arrangement for attaching labels on semiconductor modules mounted on a double-sided substrate in accordance with the method of claim 17, the arrangement including:

a first label attaching unit configured to attach the labels to the plurality of semiconductor modules mounted on the first surface of the double-sided substrate;

a first turner configured to turn over the double-sided substrate on which the labeled semiconductor modules are mounted;

a second label attaching unit configured to attach the labels to the plurality of semiconductor modules mounted on the first surface of the double-sided substrate; and a substrate transfer unit configured to transfer the double-sided substrate with the labeled semiconductor devices on the first and second surfaces in preparation for the unloading operation.

33. An arrangement for attaching labels on semiconductor modules mounted on a double-sided substrate in accordance with the method of claim 20, the arrangement including:

a first label attaching unit configured to attach the labels to the plurality of semiconductor modules mounted on the first surface of the double-sided substrate;

a substrate transfer unit configured to transfer the double-sided substrate with the labeled semiconductor modules on the first surface in preparation for a turning operation, transfer the double-sided substrate with the exposed second surface in preparation for the label attaching operation and transfer the double-sided substrate with the labeled semiconductor modules on the first surface and the second surface in preparation for a turning operation;

a first turner configured to turn over the double-sided substrate on which the labeled semiconductor modules are mounted to expose the second surface;

a second label attaching unit configured to attach the labels to the plurality of semiconductor modules mounted on the second surface of the double-sided substrate;

a second turner configured to turn over the double-sided substrate with the labeled semiconductor modules on both the first and the second surfaces; and an unloading unit configured to unload the double-sided substrate.

34. An arrangement for attaching labels on semiconductor modules mounted on a double-sided substrate in accordance with the method of claim 30, the arrangement including:

a first label attaching unit configured to attach the labels to the plurality of semiconductor modules mounted on the first surface of the first double-sided substrate;

a substrate transfer unit configured to transfer the first double-sided substrate in preparation for the turning operation or the label attaching operation;

a first turner configured to turn over the first double-sided substrate on which the labeled semiconductor modules are mounted to expose the second surface;

a loading unit configured to load the second double-sided substrate; and a second label attaching unit configured to attach the labels to the plurality of semiconductor modules mounted on the second surface of the first double-sided substrate while simultaneously attaching labels to the plurality of semiconductor modules mounted on the first surface of the second double-sided substrate.

35. The arrangement of claim 1, wherein the first turner turns over the double-sided substrate to expose the second surface thereof and turns over the double-sided substrate to expose the first surface thereof.

36. The arrangement of claim 35, wherein the first label attaching unit attaches labels to the semiconductor modules mounted on the first and second surfaces of the double-sided substrate, and the first label attaching unit is adapted to operate within an operation area of the first turner.

* * * * *